United States Patent [19]
Fischer et al.

[11] Patent Number: 5,433,965
[45] Date of Patent: Jul. 18, 1995

[54] BEVERAGE COMPOSITIONS AND SWEETENING COMPOSITIONS WHICH CONTAIN JUICE DERIVED FROM BOTANICAL SUBFAMILY CUCURBITACEAE

[75] Inventors: Christa M. Fischer, Kronberg, Germany; Heather J. Harper, Hamilton, Ohio; William J. Henry, Jr., Taylor Mill, Ky.; Marvin J. Mohlenkamp, Jr., Cincinnati, Ohio; Karin Römer, Tsi, Germany; Robert L. Swaine, Jr., Cincinnati, Ohio

[73] Assignee: The Procter & Gamble Company, Cincinnati, Ohio

[21] Appl. No.: 184,109

[22] Filed: Jan. 28, 1994

Related U.S. Application Data

[63] Continuation-in-part of Ser. No. 17,590, Feb. 16, 1993, abandoned.

[51] Int. Cl.6 .......................... A23L 1/236; A23L 2/02
[52] U.S. Cl. .................................. 426/548; 426/590; 426/599; 426/639; 426/640
[58] Field of Search ............... 426/548, 590, 599, 639, 426/640

[56] References Cited

U.S. PATENT DOCUMENTS

| | | | |
|---|---|---|---|
| 2,761,783 | 9/1956 | Ferguson, Jr. ....................... | 426/548 |
| 3,011,897 | 12/1961 | Grosvenor .......................... | 426/548 |
| 4,084,010 | 4/1978 | Takemoto et al. ................... | 426/548 |
| 4,690,827 | 9/1987 | Kupper et al. ...................... | 426/548 |

FOREIGN PATENT DOCUMENTS

| | | | |
|---|---|---|---|
| 8701559A | 5/1987 | China ............... | A23L 2/02 |
| 1062072A | 12/1991 | China ............... | A23F 3/14 |
| 52-057366 | 5/1977 | Japan . | |
| 52-083986 | 7/1977 | Japan ............... | C07G 3/00 |
| 52-143257 | 11/1977 | Japan ............... | A23L 1/22 |
| 56-117781 | 9/1981 | Japan ............... | A23L 1/22 |
| 58-071868 | 10/1981 | Japan ............... | A23L 1/22 |
| 56-158072 | 12/1981 | Japan ............... | A23L 1/22 |
| 57-086266 | 5/1982 | Japan ............... | A23L 1/236 |
| 58-036368 | 3/1983 | Japan ............... | A23L 1/23 |
| 58-116674 | 9/1983 | Japan ............... | C12L 1/00 |

OTHER PUBLICATIONS

Giovanelli et al., "Apple Juice Stabilization by Combined Enzyme-Membrane Filtration Process", *Food Science and Technology-Lebensmittel-Wissenschaft & Technologie*, vol. 26 (1993) No. 1, pp. 1-7.

Jiangsu New Medical College, Zhongyao Dachidian (Encyclopeida of Traditional Chinese Medicine), People's Publishing Company, Shanghai, (1977), pp. 1356-1357.

Kasai et al., "Sweet Cucurbitane Glycosides from Fruits of Siraitia siamensis (chi-zi luo-han-guo), a Chinese Folk Medicine", *Agric. Biol. Chem.*, vol. 53 (1989) No. 12, pp. 3347-3349.

Makapugay et al., "High-Performance Liquid Chromatographic Analysis of the Major Sweet Principle of Lo Han Kuo Fruits", *J. Agric. Food Chem.* vol. 33 (1985), pp. 348-350.

Matsumoto et al., "Minor Cucurbitane-Glycosides from Fruits of *Siraitia grosvenori* (Cucurbitaceae)", (List continued on next page.)

*Primary Examiner*—Helen Pratt
*Attorney, Agent, or Firm*—Rose Ann Dabek; Milton B. Graff, IV; Tara M. Rosnell

[57] ABSTRACT

The subject invention relates to a natural sweetening composition comprising:

(a) sweet juice derived from the botanical genus/species *Siraitia grosvenorii, S. siamensis, S. silomaradjae, S. sikkimensis, S. africana, S. borneensis, S. taiwaniana* or mixtures thereof; and (b) sugar, wherein said sugar is selected fructose, sucrose, glucose or mixtures thereof; and wherein the ratio of the sweet juice to the sugar is from about 1:1 to about 1:5. An edible acid and/or an edible salt can be added to the composition to improve the flavor. A beverage comprising an effective amount of a flavoring system and a sweetening composition is also claimed. These beverages are reduced calorie and can be supplemented with vitamins and minerals.

32 Claims, No Drawings

OTHER PUBLICATIONS

*Chem. Pharm. Bull.*, vol. 38 (1990) No. 7, pp. 2030–2032.

Matsumoto et al., "Quality Improvement of Citrus Juices" *Kogyo Gijutsu Senta*, vol. 30 (1992), pp. 49–52. (Abstract only).

"New Color Adsorbent", *Food Engineering*, Mar. 1993, p. 52.

Article re. Nestle's "Gum Syrup", *Nikkei Sangyo*, Mar. 25, 1992.

Sumitani et al., "FPD-GC Determination of S-Methylmetioninesulfonium in Satsuma Mandarin Juice", *Agric. Biol. Chem.* vol. 55 (1991) No. 11, pp. 2899–2900.

Klein, G. E. et al.; "Intense Sweetener from Lo Han Kuo (Momordica grosvenori"; *Experintia*; (May 15, 1975); vol. 31, No. 5; pp. 533–534.

BEVERAGE COMPOSITIONS AND SWEETENING COMPOSITIONS WHICH CONTAIN JUICE DERIVED FROM BOTANICAL SUBFAMILY CUCURBITACEAE

CROSS REFERENCE TO RELATED APPLICATIONS

This application is a continuation-in-part of the application having U.S. Ser. No. 08/017,590; abandoned, Filed Feb. 16, 1993 in the names of Christa Maria Fischer, Heather J. Harper, William John Henry Jr., Marvin J. Mohlenkamp, Jr., Karin Romer and Robert Leslie Swaine, Jr.

FIELD OF THE INVENTION

The present invention relates to sweetening compositions, beverages, and more particularly, to reduced calorie beverages sweetened with the sweet juice derived from botanical subfamily Cucurbitaceae. In addition, the invention relates to a composition for sweetening the beverages and other edible products.

BACKGROUND OF THE INVENTION

Some plants of the botanical family Cucurbitaceae, found mostly in China and other parts of Asia produce intensely sweet fruits. These fruits have a characteristic intense sweetness due to the presence of certain terpene glycosides; natural materials which can provide sweetness. These compounds, (triterpene glycosides) known as mogrosides and siamenosides, are described and characterized, by Matsumoto et al; *Chem. Pharm Bull.*, 38(7), 2030–2032(1990) and R. Iasai et al., *Agri. Biol. Chem.*, 53(12), 3347–3349 (1989).

A fruit in the Cucurbitaceae subfamily, called Luo Han Guo or Rakanka, is produced by the plant *Siraitia grosvenorii* found in southern China. Extracts of the fruit and the dried form of the fruit have been used in edible products. Luo Han Guo has been known as a naturally sweet fruit for many years. A gum syrup made with extracts of Rakanka combined with stevia (a low calorie sweetener) is known in Japan.

Traditionally, these fruits are dried and stored in the dry state until used. The dried fruits are used whole, as extracts, or in powdered or block forms. The prepared block form "Luohanguo Chongji" is reported to be a popular treatment for colds and the dried fruits are used in a variety of traditional Chinese medicines, see for example, *The Encyclopedia of Traditional Chinese Medicine* (Jiangsu New Medical College, 1977, Zhongyao Dachidian People's Publishing Co., Shangai, China).

While the drying process preserves the fruit and removes most of the objectionable flavor from the fresh fruit, it also causes the formation of bitter, astringent and brown flavors. These flavors restrict the use of the dried fruits and dried fruit extracts to the preparation of dilute teas and soups and products to which sugar, honey and the like are added.

Fresh fruits are occasionally used by the farmers to make sweeteners and soups during harvest season. Small amounts of the fresh fruit pulp may be eaten like candy. However, consumption of the fruit in large quantities is limited, due to the intense sweetness, and unattractive vegetable flavor.

Luo Han Guo is seldom used as fresh juice due to the problems of storing it, its unattractive vegetable flavor and its tendency to form off flavors. It has a natural pH of about 6 and it contains sugars which can brown and ferment. The pectin eventually gels on standing.

Due to the restrictions on the use of Luo Han Guo juice in particular because of the instability over time and its unattractive taste, beverages containing Luo Han Guo have not been widespread.

A process for preparing and stabilizing a concentrated Luo Han Guo juice is described in applications Downton et al, U.S. Ser. No. 08/056,459 filed May 3, 1993 now abandoned. This process makes a Cucurbitaceae fruit juice puree, serum or concentrate which is suitable for use in the subject application.

The juice has an improved flavor and is essentially free of the vegetable flavor and the bitter, astringent, brown flavor of the extracts of the dried fruit. Certain flavor characteristics of Luo Han Guo juice necessitate modification of the formulation of some edible products when the sugar is replaced in whole or in part with Luo Han Guo juice, serum or puree. For example, because the sweet component of Luo Han Guo is reported to be from about 300 to about 500 times as sweet as sucrose, use of Luo Han Guo to provide the sweetening equivalent of the sugar it replaces results in a substantial decrease in the amount of sugar needed. However, when used at concentrations equivalent to 10% to 20% sugar solutions, it also can cause a very sweet aftertaste, often described as "cloyingly" sweet or licorice-like sweetness.

The use of Luo Han Guo sweet juice, puree or serum in good tasting and storage stable beverages has not been previously disclosed. Also, the use of Luo Han Guo juice to provide additional low-calorie sweetness to otherwise unaltered beverages like lemonade, milk, milk shakes, fruit juices and fruit juice containing beverages, black tea or coffee is also not known.

Due to the instability of Luo Han Guo juice over time and its unattractive flavor, beverages containing Luo Han Guo juice have not been widespread.

The object of the subject invention is to provide a natural sweetening composition for sweetening edible products which has no sweet aftertaste or unpleasant aftertaste.

Another object of the subject invention is to provide improved low calorie edible products in which Luo Han Guo serum, puree or juice is used as a sweetening ingredient in place of sugar.

It is also an object of the present invention to provide beverages giving a sweetness perception beyond that provided by their usual sugar content. It is further desired to provide beverages with a non-caloric sweetness from a natural source, in particular to allow full or partial replacement of artificial sweeteners. In this respect it is also desirable to provide beverages useful within the dietary constraints of diabetes patients.

It also is an object of the present invention to provide reduced calorie, thirst quenching beverages comprising a flavoring system which limits the calorie content of the beverage and which contains a natural sweetening system comprising mogroside IV, mogroside V, siamenoside I or mixtures thereof and which has acceptable mouth feel and taste characteristics, particularly, a beverage without off-flavors.

It is a further object of this invention to produce a juice, and in particular, a fruit juice, which is lower in sugar and calories by blending the very sweet Cucurbitaceae juice with other fruit juices.

These and other objects of the invention are described herein.

SUMMARY OF THE INVENTION

The subject invention relates to a natural sweetening composition comprising:

(a) sweet juice derived from the botanical genus/species *Siraitia grosvenorii, S. siamensis, S. silomaradjae, S. sikkimensis, S. africana, S. borneensis, S. taiwaniana* or mixtures thereof; and (b) sugar, wherein said sugar is selected fructose, sucrose, glucose or mixtures thereof; and wherein the ratio of the sweet juice to the sugar is from about 1:1 to about 1:5.

An edible acid and/or an edible salt can be added to the composition to improve the flavor.

A beverage comprising an effective amount of a flavoring system and a sweetening composition is also claimed.

DETAILED DESCRIPTION OF THE INVENTION

Definitions

As used herein, the term "comprising" means various components can be conjointly employed in the beverages of this invention Accordingly, the terms "consisting essentially of" and "consisting of" are embodied in the term comprising.

As used herein the term "reduced calorie" beverage means beverages which have fewer calories than their counterparts made of similar compositions and attempting to achieve the same (or similar) taste and organoleptic characteristics, especially sweetness. A reduced calorie juice beverage has fewer calories than the same juice beverage having an equally sweet and acceptable taste.

As used herein the term "fruit flavors" refers to those flavors derived from the edible reproductive part of the seed plant, especially one having a sweet pulp associated with the seed, for example, apples, oranges, lemon, limes, etc. Also included within the term fruit flavor are synthetically prepared flavors made to simulate fruit flavors derived from natural sources. Particularly preferred fruit flavors are the citrus flavors including orange, lemon, lime and grapefruit flavors. A variety of other fruit flavors can be used such as apple, grape, cherry, pineapple, coconut and the like. These fruit flavors can be derived from natural sources such as fruit juices and flavor oils or synthetically prepared. If desired, fruit juices, including orange, lemon, lime, apple and grape can be used in a flavor component.

As used herein, the term "botanical flavor" refers to flavors derived from parts of the plant other than the fruit. As such, botanical flavors can include those flavors derived from nuts, bark, roots and leaves. Also included within this term are synthetically prepared flavors made to simulate botanical flavors derived from natural sources. Examples of botanical flavors include cola flavors, tea flavors, coffee and the like. These botanical flavors can be derived from natural sources such as essential oils and extracts or be synthetically prepared. Coffee, black tea, and herbal tea extracts can be used as the flavorant herein.

As used herein the term "naturally" means generated by biological processes in animals or plants. Accordingly the terms "generated from wild or domestic plants or animals" and "generated by biotechnology, molecular biotechnological methods or bio-engineering" are included in the term naturally.

As used herein "single strength" refers to recommended drink strength, i.e. the ready-to-serve concentration of beverage compounds.

As used herein, the term "fruit juice" refers to citrus and non-citrus juices including some vegetable juices. The fruit juice can be provided as juice made from apple, cranberry, pear, peach, plum, apricot, nectarine, grape, cherry, currant, raspberry, gooseberry, blackberry, blueberry, strawberry, lemon, lime, mandarin, orange, grapefruit, potato, tomato, lettuce, celery, spinach, cabbage, watercress, dandelion, rhubarb, carrot, beet, cucumber, pineapple, custard-apple, coconut, pomegranate, guanabana, kiwi, mango, papaya, banana, watermelon and cantaloupe. Preferred juices are apple, pear, lemon, lime, mandarin, grapefruit, cranberry, orange, strawberry, grape, kiwi, pineapple, passion fruit, mango, guava and cherry. Citrus juices, preferably grapefruit, orange, lemon, lime, mandarin or mixtures thereof are most preferred.

As used herein, the term "sweet juice", including the terms "puree or serum" and "sweet juice concentrate", refer to the puree or serum or juice from any fruit from the plant of the family Cucurbitaceae, tribe Jollifieae, subtribe Thladianthinae, genus Siraitia. Especially preferred are the genus/species *S. grosvenorii, S. siamensis, S. silomaradjae, S. sikkimensis, S. africana, S. borneensis*, and *S. taiwaniana*. The most preferred fruit is the genus/species *S. grosvenorii*, which is often called Luo Han Guo fruit. Although the following description of the products of this invention is described with particular reference to making a Luo Han Guo sweet juice or concentrated juice, puree or serum, other juices of the Cucurbitaceae family which contain at least 0.01% sweet triterpene glycosides or mogrosides are useful in this invention. Preferably the juices will contain more than 0.1% to about 15% mogrosides, preferably mogroside V, mogroside IV, siamenoside and mixtures thereof. These as sweet juices can be concentrated but are mostly used as a single strength juice or as dry powders.

As used herein the term "thirst quenching" relates to the physiological ability of replenishing water through the human digestive system faster than a comparable beverage not designed for thirst quenching. Thirst quenching or rehydrating is related to the ability of a beverage to pass quickly from the stomach of a user to the intestines. A reduction of sugar in a beverage increases the rate of rehydration and therefore improves the thirst quenching.

As used herein the term "edible product" is intended to have a broad meaning and encompasses formulated products intended to be consumed and ingested as well as products, such as chewing gums and the like, which are not normally intended to be swallowed. The edible product can be a beverage, food or medicament or other type pharmaceutical preparation. It also encompasses food material such as confections, icings, puddings and custards, baked goods, batters, frozen foods, sauces and the like, which can be provided in final edible form after further cooking applications.

All ratios, proportions and percentages herein are by weight, unless otherwise specified.

An objective of the subject invention is to provide a natural low calorie sweetening composition. However, the sweetening characteristics of Luo Han Guo are not the same as those of sucrose or other sugar, such as fructose, honey or invert syrups in the same system. The formulation requires modification in order to simulate the sucrose sweetened product. It has been recognized that simple substitution of Luo Han Guo for sucrose in sweetened products does not necessarily lead to a product similar to or as desirable as the sugar-sweetened product. The level of Luo Han Guo used to provide "a normally acceptable degree of sweetness" is intended herein to refer to an amount of unconcentrated Luo Han Guo sweet juice which will provide an average sweetness intensity generally approximating the sweetness intensity obtained when sucrose is the sweetener for the product. In general, it will be added at about 0.1 to about 1 times the amount of the sugar normally present in the composition, or 10% to 100% of the related sugar level.

Sweetener

The sweetener composition of the subject invention is produced by mixing the sweet juice from the plant of the family Cucurbitaceae, tribe Jollifieae, subtribe Thladianthinae, genus Siraitia with a sugar component selected from the group sucrose, fructose, glucose or mixtures thereof. It is preferred that the sweet juice be from the genus/species *S. grosvenorii, S. siamensis, S. silomaradjae, S. sikkimensis, S. africana, S. borneensis,* and *S. taiwaniana* and contain at least 0.01% triterpene glycosides or mogrosides. The most preferred fruit is the genus/species *S. grosvenorii*, often called Luo Han Guo fruit, which contains from about 0.1% to about 5% mogrosides, preferably mogroside V, mogroside IV, siamenoside and mixtures thereof.

The amount of Luo Han Guo will vary according to degree of sweetness desired and the degree of sweetness already provided by the sugars present.

Sugars typically used in the Luo Han Guo sweetener of the subject invention are sucrose, fructose, glucose or mixtures thereof. Any source of sucrose, fructose or glucose may be used, as for example, cane sugar, invert sugar, honey, high fructose corn syrup, fruit sugar, molasses, invert syrup, and liquid sugar preparations. Fruit juices which usually contains sucrose, fructose, and glucose may be used instead of the pure sugars. Other exotic fruits, vegetables or plants which may contain other natural sweeteners or sweetness enhancers, for example stevioside, thaumatin and glycyrrihizin, can be used to further supplement the sweetness of the sweetener. Artificial sweeteners can be used to supplement the sweetener of the subject invention but their use is not preferred.

The ratio of sweet juice to sugar depends on the triterpene glycoside in the juice. For typical sweet juices having about 1% mogroside or siaminoside the ratios from about 1:1 to about 1:5. Preferably the ratio of sweet juice to sugar is from about 1:1 to about 1:3. For a sweet juice sweet juice that contains at least about 0.01% mogroside or triterpene glycoside, the ratio of triterpene glycoside to sugar is about 1:100 to about 1:000, preferably from about 1:100 to about 1:500. When fruit juice is used in the beverage, the amount of sugar contributed by the fruit juice is used as the amount of sugar used for adjusting the sweet juice to sugar ratio. Since most single strength fruit juices contain between 10 and 14% sugar, the ratio of fruit juice to sweet juice (Luo Han Guo) will be from about 5:1 to about 50:1.

Sweet juice compositions of the present invention, especially when concentrated or dried, can be used as sweeteners for many purposes. Examples of such uses as a sweetener are in beverages, such as tea, coffee, fruit juice and fruit-flavored beverages; foods, such as jams and jellies, peanut butter, pies, puddings, cereals, candies, ice creams, yogurts, Popsicles; health care products, such as dentifrices, mouthwashes, cough drops, cough syrups; chewing gum; and as a sugar substitute.

The sweetening composition is added to the edible product in an amount sufficient to provide an organoleptically equivalent sweetening sensation as sugar. Typically, for every 12% sugar removed from a formulation, from about 1% to about 8% of the sweetener composition can be used. For a single strength Luo Han Guo juice plus sucrose (1:2 weight/weight) sweetening compositions, from about 3% to about 8% of a liquid sweetener is used.

The edible product may be coated with the sweetener or the sweetener can be contained in the composition, for example such as batters, frozen foods, sauces, fillings, and other nutritive ingredients. Examples of frozen foods include sauces, desserts, pastries and the like. Suitable edible materials include batters for cakes, cookies, breads, pastries and pie doughs.

For the batters of cakes, cookies, breads, pastries and pie doughs the sweetening composition can typically be included along with the water. The amounts of the components and the ingredients used in the batter composition are those amounts and ingredients typically used in preparing baked foods. The compositions can be prepared according to known methods.

Sweet Juice Composition

The sweet juice compositions are made from Cucurbitaceae fruit, and typically comprise, on a dry weight basis, from about 40% to about 60% sugars, such as glucose, fructose and sucrose; from 0% to about 25% protein (includes free amino acids and/or peptides); from 0% to about 4% fat; from about 1% to about 6% ash; from about 5% to about 20% organic acids, such as citric acid and malic acid; from 0% to about 2% vitamin C; and from 0% to about 10% other materials.

The sweet juice preferably comprises, on a dry weight basis, less than about 100 ppm of the free amino acid methionine, more preferably less than about 70 ppm, most preferably less than about 50 ppm.

These sweet juice compositions comprise, on a dry weight basis, from about 0.1% to about 15% mogrosides, preferably greater than about 1% mogrosides, more preferably greater than about 4% mogrosides, more preferably still greater than about 7% mogrosides.

Preparation of the Sweet Fruit Sweet Juice

The fresh fruit is selected, stored, and processed to provide a high level of sweetness, remove/avoid decayed fruit, and facilitate removal of the outer peel from the inner meat. The washed and sorted fruit is prepared for extraction by removing the crest or peel by any conventional method for coring fruits and vegetables. As long as peel and seeds are removed quickly from the mashed fruit of the next stage, the fruit does not need to be peeled. Off-flavor can form due to juice and peel contact.

Preferably, the fruit is mashed in an oxygen-restricted atmosphere. Equipment used for mashing apples, potatoes and other soft fruits and vegetables can be used to pulverize the fruit core, such that seed break-up is minimal. Luo Han Guo contains a large number of seeds; peel and seeds are about 40–50% by weight of the fruit. Water can be added to the peeled fruit during processing to help separate the seeds. It will also dilute the juice, but can be removed in a concentration step.

The raw juice or fruit as it comes from the mashing, comminuting or extracting process contains pulp, seeds, and possibly peel. These are separated from the juice in a "finisher" or centrifugal extractor which contains a screen. The screen opening size can range from about 0.5 mm to about 6.5 mm. When the screen opening is larger than 6.5 mm, small seeds pass into the juice and contaminate it.

The juice obtained from the process steps described above is a sweet juice puree. The term "sweet juice", as used herein, includes such juice puree or juice with pulp. When the pulp or solid particles are substantially removed, the juice is referred to as clear juice.

Acidification

Acidification is optional in the process, but is an important step in the preparation of preferred Luo Han Guo puree used in this invention. Acidified juice is lighter in color, less bitter and does not gel. The lack of gelling aids in the processing and drinkability of the juice. Acidification also makes the juice taste more fruity and less "beany" or "vegetably".

Acid is added to the juice, preferably before or during homogenization, to lower the pH from about 6.0 to less than about 5.3, preferably to about 3.5 to about 4.5, and most preferably to about 3.8 to about 4.2. Any food compatible organic or inorganic acid can be used. Citric, malic, lactic, tartaric and acetic acids are preferred. Phosphoric, sulfuric and hydrochloric acids can be used, but they can contribute an astringent or bitter flavor. Nitric acid can be used but it may not be approved for use in all beverages. Mixtures of these acids can also be used. Other fruit juices which are acidic, such as citrus, pineapple and apple juices can be used to acidify the juice.

The acidification prevents the puree from gelling when it is concentrated. At pH's below 4.5, and preferably in the range of 3.8 to 4.2, the pasteurized juice is microbially more stable. Optionally, gelling can be prevented by pectin removal as described below.

Homogenization

The juice exiting the finisher may contain large pieces of fruit pulp material. If so, it is preferably blended in a high speed mixer such as a blender, in-line mill or homogenizer. The juice has a tendency to foam. The headspace in the blender or homogenizer should be minimized to prevent or minimize the aeration of the juice during processing. The purpose of this step is to lower the particle size to less than about 850 microns.

Removal of Off-Flavor Precursors

Evaporation of volatiles from the juice will remove much of the undesirable flavor notes from the juice. However, off-flavor precursors will remain in the juice. The Cucurbitaceae fruit juice or puree can also be treated at any step or stage of the process to remove off-flavor materials and precursors, which include sulfurous materials and/or off-flavor precursors which include sulfur-containing amino acid materials. The precursors are the source of undesirable sulfurous or vegetable-like odors and off-flavors which can form in the finished sweet juice or puree product.

Ideally the juice or puree material will be treated to remove substantially all of the volatile sulfurous materials and sulfur-containing amino acid based off-flavor precursors. Such precursors include methionine, S-methylmethionine, cystine, and cysteine, and proteins and peptides containing them. Substantially improved Cucurbitaceae fruit juice can be prepared by reducing the amino-nitrogen compounds of the juice, which include such sulfur-containing amino acids, peptides and proteins, by at least about 70% (only about 30% of the original amino nitrogen content remaining) while reducing mogroside content of the juice by no more than about 20% (at least about 80% of the original mogroside content remaining). More preferably, amino nitrogen content is reduced by at least about 80% while holding the removal of mogroside to no more than about 15%. The present invention processes preferably reduce by at least about 80%, more preferably by at least about 90%, the free amino acids.

Removal of off-flavor materials and precursors by removal of pulp solids and use of ion exchange resins, fining agents, adsorbents, and precipitating agents can be accomplished in a single step or separate or multiple steps, preferably using filtration or centrifugation to remove pulp solids, ion exchange resins, fining agents, adsorbents and precipitates from the juice.

Preferred processes include treatment of the sweet juice, before or after acidification, with enzyme. Treatment of the juice with certain enzymes, such as pectinase, amylase, or multienzyme combinations (e.g., pectinase, cellulose, glycosidase), can help in the removal of off-flavor materials and precursors, and in clarification of the juice. Pectinase is a preferred enzyme; it removes pectin from the juice, providing clarity and preventing gelling of the juice. Suitable amounts of enzymes, especially pectinase, added to the juice (generally as a dilute solution) are from about 0.001% to about 1%, preferably from about 0.005% to about 0.05% (dry basis).

Preferred processes include removal of off-flavor materials and precursors from the sweet juice by blending fining and/or adsorbent and/or precipitating agents to the juice, and then removing the resulting agent/precipitate, preferably by filtration or centrifugation. The preferred agents used and suitable amounts are as follows:

activated charcoal in an amount of from about 0.1% to about 5%, preferably from about 0.25% to about 2%;

gelatin (preferably added as a dilute solution) in an amount of from about 0.001% to about 0.5%, preferably from about 0.005% to about 0.15% (dry basis);

bentonite (preferably added as a slurry) in an amount of from about 0.05% to about 3%, preferably from about 0.1% to about 1% (dry basis);

silica in an amount of from about 0.1% to about 5%, preferably from about 0.25% to about 2% (dry basis).

These agents are suitably blended with the juice until the desired effect is achieved, typically for at least about 0.5 hr., preferably for from about 1 hr. to about 2 hr., at a temperature of from about 10° C. to about 60° C., preferably from about 20° C. to about 50° C.

Removal of Volatiles and Concentration

The removal of off-flavor precursors and materials described above may not remove all off-flavor volatiles, including sulfur-containing volatiles, from the sweet juice. Such off-flavor volatiles are preferably removed in a step, after the removal of the off-flavor precursors, in order to minimize generation of additional off-flavor volatiles from the precursors. However, reversal of these steps can still yield juice with acceptable flavor.

Sulfur-containing volatiles are typically present in low amounts (less than 1 ppm) in the extracted juice, but give the juice undesirable aroma and flavor even at such low levels. Additional volatiles are formed from the precursors, especially upon exposure of the juice to air and/or heat. It is preferable to reduce the sulfur-containing volatiles in the juice by at least about 80%, more preferably by at least about 90%, more preferably still by at least about 95%.

The use of activated charcoal, as described above, can be used to remove off-flavor volatiles, including sulfur-containing volatiles.

An evaporator or other concentrating equipment is used to remove certain volatiles from the sweet juice or sweet juice puree, and preferably to concentrate it. Standard evaporation under elevated temperatures and lower pressure can be used. Evaporation removes undesirable flavor notes and also some water. Evaporation should be carried out in a manner that artificial, cooked or manufactured flavors are minimized or totally eliminated. Therefore, low temperatures and/or times are preferred for such evaporation. The removed volatiles can be totally or partially recovered, concentrated and used for other food flavor applications, added back to the juice, or discarded.

A multi-stage, multi-effect vacuum evaporator such as the TASTE (thermally accelerated short time evaporator) can be used. For small scale batches, a rotary or centrifugal evaporator, such as a centritherm can be used.

The volatiles in the sweet juice consist of "beany", green pepper, potato, caramel, mint and earthy notes. Most of these materials are removed in the volatile removal process. Preferably at least 50% of the volatiles are removed and most preferably about 90% of the volatiles are removed during the evaporation. The most preferred products have a methylene chloride extract of volatiles of from about 1 ppm to about 25 ppm. This is easily measured by gas chromatographic analysis.

The evaporated concentrate is cooled and can either be sent to a blend tank and mixed with other components of the product or further chilled to about $-18°$ C. and stored in tanks and drums under an inert gas atmosphere such as nitrogen or carbon dioxide. These storage tanks should be shielded from light to prevent light-induced degradation of the concentrate.

The sweet juice can be concentrated from a typical concentration of the puree of 9° to 24° Brix to about 15° to about 65° Brix. Preferably the juice puree or clear juice has a concentration of from at least 35° Brix and most preferably, from 40° Brix to 65° Brix. As used herein, "Brix" is essentially equal to % solids content. When using the concentrate, it is necessary to adjust the sugar level of the sweetener to compensate for the added mogroside levels.

Stabilization

Preferred processes for making sweet juice include a heating step in order to inactivate enzymes in the juice and/or pasteurize the juice. Inactivation of enzymes helps preserve flavor and stability of the juice. Pasteurization prevents microbial growth in the juice. Such heating process preferably holds the juice at a temperature of from about 90° C. to about 130° C. for from about 3 sec. to about 60 sec., more preferably from about 120° C. to about 125° C. for from about 3 sec. to about 5 sec., also preferably from about 90° C. to about 95° C. for from about 20 sec. to about 3 min.

The juice should be cooled to room temperature within about 30 minutes after heating. Preferably it is so cooled within 5 to 10 minutes.

Beverage Compositions

The present invention further relates to a reduced calorie, thirst quenching beverage comprising a flavoring system, a sweetening system and water. The flavoring system is selected such as to provide the reduced calorie thirst quenching beverage with a sugar content of less than 8% by weight of the beverage on a single strength basis. The sweetening system comprises a naturally derived mogroside IV, mogroside V, 11-oxo-mogroside V, siamenoside I or mixtures thereof in an amount on a single strength basis of at least 0.002% by weight.

The flavoring system can comprise a fruit juice, a fruit flavor, a botanical flavor or mixtures thereof. In particular the combination of tea flavors, preferably green tea or black tea flavors, together with fruit juices have an appealing taste. The fruit juices are selected from citrus or non-citrus fruit juices and are present in an amount from 3% to 60%, preferably between 5% and 35%, more preferably from about 5% to about 25% by weight. The flavoring system can also comprise milk or milk type flavors, including yogurt.

The sweetening system is preferably selected to provide the beverage with mogroside IV, mogroside V, siamenoside I or mixtures thereof in an amount of 0.002% to 0.1% on a single strength basis. The sweetening system preferably comprises a juice of a fruit belonging to the botanical tribe Joliffieae of the botanical subfamily Cucurbitaceae and, in particular, fruit juice of the Luo Han Guo fruit. This fruit juice in the sweetening system is present preferably at an amount from 0.2% to 10%.

It has been found that the inclusion of from about 1% to about 3% sugar, up to about 0.25% of an edible acid and optionally an edible salt in a beverage in which Luo Han Guo is used in a sweetening amount, produces a beverage which has the sweetness and taste characteristics closely similar to those exhibited by a sucrose or fructose-sweetened beverage, particularly with respect to the initial build up of sweetness, the duration of peak sweetness intensity, the overall duration of sweetness perception, and taste perception of the fruit flavors.

The sweetness profile the Luo Han Guo is characterized by a delayed onset of sweetness (relative to sucrose) to a peak intensity and continuance of such sweetness, at essentially the same intensity, for long period of time. This is unlike the profile for the sucrose sweetened product wherein there is a build-up of sweetness to a peak intensity level, followed by a drop in intensity to near zero, all within a relatively brief period.

The beverages can be carbonated. The beverages can also contain mineral and/or vitamins.

The flavoring system according to the present invention can also comprise flavors selected from fruit flavors, botanical flavors and mixtures thereof. Particularly preferred fruit flavors are the citrus flavors including orange flavors, lemon flavors, lime flavors and grapefruit flavors. Besides citrus flavors, a variety of other fruit flavors can be used such as apple flavors, grape flavors, cherry flavors, pineapple flavors and the like. These fruit flavors can be derived from natural sources such as fruit juices and flavor oils, or else be synthetically prepared.

The flavor component can comprise a blend of various flavors e.g. lemon and lime flavors, citrus flavors and selected spices (the typical cola softdrink flavor) etc. If desired, fruit juices such as orange juice, lemon juice, lime juice, apple juice, grape juice and the like can be used in the flavor component. The flavor in the flavor component is sometimes formed into emulsion droplets which are then dispersed in the beverage drink. Because these droplets usually have a specific gravity less than that of water and would therefore form a separate phase, weighting agents (which can also act as clouding agents) are typically used to keep the emulsion droplets dispersed in the beverage. Examples of such weighting agents are brominated vegetable oils (BVO) and resin esters, in particular the ester gums. See L. F. Green, *Developments in Soft Drinks Technology, Vol. 1* (Applied Science Publishers Ltd. 1978) pp. 87-93 for a further description of the use of weighting and clouding agents in liquid beverages.

The flavoring system according to the present invention may also comprise milk or milk type flavors.

The particular amount of the flavor component effective for imparting flavor characteristics to the beverage of the present invention can depend upon the flavor(s) selected, the flavor impression desired, and the form of the flavor component. For flavor components which are substantially free of fruit juice, i.e., on a single strength basis no more than about 1% fruit juice by weight of the beverage, the flavor component can be comprised in an amount of at least 0.001% by weight of the beverage and typically from 0.01% to 3% by weight especially if the beverage is to be carbonated. When fruit juices are used, the flavor system can comprise, on a single strength basis, from 3% to 60% fruit juice by weight of the beverage, preferably from about 6% to about 35% fruit juice by weight.

Blending

Sweet juice puree or serum compositions of the present invention can be blended with other fresh sterilized or pasteurized juice to make lower calorie (lower sugar) beverage products. On a volume/volume basis, blends of from 10:1 to 1:100 are preferred.

The sweet juice (Luo Han Guo) is blended with other juices and flavors to make low calorie beverages. Such other juices include apple, cranberry, pear, peach, plum, apricot, nectarine, grape, cherry, currant, raspberry, gooseberry, blackberry, blueberry, strawberry, lemon, orange, grapefruit, potato, tomato, lettuce, celery, spinach, cabbage, watercress, dandelion, rhubarb, carrot, beet, cucumber, pineapple, custard-apple, pomegranate, guanabana, kiwi, mango, papaya, banana, watermelon, passion fruit and cantaloupe. Preferred other juices are apple, pear, lemon, grapefruit, cranberry, orange, strawberry, grape, kiwi, pineapple, passion fruit, mango, guava, cherry, rosehips, lychee, water chestnuts and cane sugars. Citrus juices are preferred for blending with the present invention juices because of their high acidity.

Citrus juice blends can also contain citrus pulp. From 0% to 19% (v/v) pulp is acceptable. Preferably, the amount of pulp will be 3% to 12% (volume/volume) and be 0.50 min. to 5 min. in size.

Flavors selected from natural flavors, botanical flavors and mixtures thereof can be added to the sweet juice of the present invention.

The particular amount of the flavor component effective for imparting flavor characteristics to the beverages of the present invention ("flavor enhancing") can depend upon the flavor(s) selected, the flavor impression desired, and the form of the flavor component. The flavor component can comprise at least 0.001% by weight of the beverage composition, and preferably it is from about 0.01% to about 10%, preferably from about 0.01% to about 3%. When fresh juices are used as the flavor, the level of juice can be from about 0.05% to about 65%, preferably from about 6% to about 35%.

Beverages according to the present invention may also be carbonated. Usually a beverage will be considered to be carbonated if it comprises more than 30%, preferably more than 100% by volume of the beverage of solubilized carbon dioxide. Carbonated beverages comprise typically from 100% to 450%, preferably from 200% to 350% carbon dioxide by volume of the beverage. Carbonated beverages usually contain very low levels or no pulp.

The carbonated beverage can then be placed in a container such as a bottle or a can and then sealed. See L. F. Green, Developments in Soft Drinks Technology, Vol. 1 (Applied Science Publishers Ltd. 1978), pp. 102-107, for a further description of beverage making in particular the process for carbonation.

Fruit Juice, Sugar Concentration

A primary objective of the present invention is to provide a beverage which is pleasing in taste, mouthfeel and other organoleptic qualities without the use of added sugar or artificial sweetener. It has long been a desire to provide an all natural low calorie, thirst quenching beverage, however combinations of fruit juice flavors or other flavors systems apparently were never considered to satisfy the sweetness needed to make an acceptable beverage. Typically fruit juice beverages having less than 100% fruit juice usually contain an artificial sweetener or added sugar because it was not believed that the fruit juice alone would provide satisfactory tasting beverages. Low-sugar containing flavors in soft drinks often contain artificial sweeteners.

Fruit juice usually contains glucose, fructose and sucrose. However exotic fruits or vegetables or plants may contain other natural sweeteners or sweetness enhancers. For example stevioside, thalin, thaumatin and glycyrrihizin are natural sweeteners. They can be used to further supplement the sweetness of the beverage.

Examples of the non-nutritive sweeteners found in exotic fruit are dulcin or 4-ethoxyphenylurea from miracle fruit, (synsepalum dulcificum from the family sapotaceae) and monellin, a protein from the berry of the plant dioscoreophyllum cumminsii and thaumatin from the fruits of the plant *Thaumatococus daniellii*. These non-nutritive sweeteners of these exotic fruits have not been shown to provide an alternative to Luo Han Guo juice and the mogroside IV, mogroside V, siamenoside I or mixtures thereof, because of their scare supply and flavor limitations. Combinations of these with the sweet juice from Curcubitacea may be desirable. Artificial sweeteners, such as aspartame (Nutrasweet ®) or saccharin can be used to supplement sweetness to the beverages according to the present invention but their use is not preferred.

The presence of sugar in the beverage of the present invention provides a stabilizing effect. Solubilized sugar has a major influence on the viscosity and hence the organoleptic experience when drinking the beverage, since viscosity influences the time during which the liquid remains on the tongue. Due to the particular characteristics of the sweetening system of the present invention this time aspect of a lingering sweet taste of sugar in beverages can be maintained or even improved while reducing the total sugar content.

According to the invention a maximum of 8%, preferably 6%, most preferably 3%, of solubilized sugar is present in the reduced calorie, thirst quenching beverage. The exact amount of sugar depends on the other compounds of the beverage and their impact on its viscosity, osmolarity and, especially, on the taste of the beverage and on the caloric content. The reduced calorie, thirst quenching beverage may contain 0% sugar. However typically the lower amount of solubilized sugar is 0.5%, preferably 1%, most preferably 2%.

According to the present invention, the beverage comprises a sweetening system which contains at least 0.002% of a naturally derived sweet terpene glycoside, such as mogroside IV, mogroside V, siamenoside I, 11-oxo-mogroside V or mixtures thereof. Chemically mogrosides are triterpene glycosides which are more fully described in U.S. Pat. No. 4,084,010. In particular mogroside IV, mogroside V and siamenoside I have a low calorie content and a sweetness which is said to be from about 300 to 500 times that of sugar. They are therefore especially useful as a sugar replacement or sweetening compound for beverages. The characteristics and chemical structural formula of mogroside IV, mogroside V, siamenoside I have been described by Matsumoto et al., *Chemical-Pharmaceutical Bulletin* 38 (7), page 2030–2032, 1990 and R. Kasai et al., *Agri. Biol. Chem.* 53, (12) page 3347–3349, 1989.

Synthetic mogroside or siamenoside are not desirable since the process of making it is difficult. Its use in beverages for human consumption may not be allowed and in many countries for regulatory reasons. Therefore a supply of natural mogroside IV, mogroside V, siamenoside I or mixtures thereof is required according to the present invention.

The preferred amount of mogroside IV, mogroside V, siamenoside I or mixtures thereof by weight in the reduced calorie, thirst quenching beverage is from 0.002% to 0.1%, more preferably 0.008% to 0.054%, and most preferably, 0.008% to 0.027%. The appropriate amount of mogroside IV, mogroside V, siamenoside I or mixtures thereof in the beverages according to the present invention depends on the desired sweetness of the finished beverage composition including sugars and other sweeteners already incorporated through the flavoring system in the beverage.

The sweetener system of the beverage of the present invention can comprise juice from any fruit from the plant of the family Cucurbitaceae, tribe Joliffieae, subtribe Thladianthinae, genus Siraitia. Juices from fruit of the family Cucurbitaceae are known to comprise a mixture of glycosides including mogroside IV, mogroside V, siamenoside I. Especially preferred are the genus/species *S. grosvenorii, S. siamensis, S. silomaradiae, S. sikkimensis, S. africana, S. Borneensis,* and *S. taiwaniana*. The most preferred fruit is the genus/species *S. grosvenorii*, which is often called Luo Han Guo fruit. Although the following description of the composition of the beverage of this invention is described with particular reference to use of Luo Han Guo it will be understood that the beverage composition need not be limited thereto. The beverage of the present invention may comprise other fruit juices of the Cucurbitaceae family, provided the contents is set to achieve satisfactory sweetness and taste profiles.

As indicated before there are several reasons not to employ dried Luo Han Guo fruit and infusions or extracts from the dried fruit. The dried Luo Han Guo fruit usually contains several additional flavor components which can not be easily separated from the desired Luo Han Guo sweet taste composition. Therefore, specially processed Luo Han Guo juice is used as a component of the sweetening system of the present invention. Due to the quick deterioration and undesirable taste profile of Luo Han Guo fruits and, in particular, of Luo Han Guo juice or juice concentrate, no juice of Luo Han Guo had been made available previously in commercial quantities. The particular process steps to provide a useful Luo Han Guo juice are fully described above.

From 0.2% to 10% Luo Han Guo juice by weight of the beverage on a single strength basis are used, preferably from 1% to 6%, and, most preferably, from 1% to 3% are used. In the beverages of the present invention, the amount of Luo Han Guo juice depends on the other compounds in the composition of the beverage and the desired overall sweetness requirements.

As mentioned earlier, the sweetening characteristics of Luo Han Guo are not the same as sucrose in the same system. This is particularly true for fruit flavored beverages. However, the formulation modifications of the subject invention can bring the actual sweetness-time intensity profile of the Luo Han Guo sweetened product more in line with that obtained in the sucrose-sweetened counterpart.

It has been found that the inclusion of from about 1% to about 3% sugar, up to about 0.25% of an edible acid and optionally an edible salt in a beverage in which Luo Han Guo is used in a sweetening amount, produces a beverage which has the sweetness and taste characteristics closely similar to those exhibited by a sucrose or fructose-sweetened beverage, particularly with respect to the initial build up of sweetness, the duration of peak sweetness intensity, the overall duration of sweetness perception, and taste perception of the fruit flavors.

The benefits of the sugar and edible acid and or salt levels in a Luo Han Guo sweetened product cannot be characterized independently; however, generally, the edible acid appears to have the effect of cleansing the taste buds of lingering sweetness and taste otherwise produced by the Luo Han Guo sweetener so as to prevent a build up of sweetness with successive ingestion of product portions as well as prepare the taste buds for accurate response to the sweetness presented with each new intake of product. The sugar reduces the delayed onset of sweetness exhibited by the Luo Han Guo sweetener.

Organic as well as inorganic edible acids may be used to enhance the sweetness and reduce the lingering sweetness effect of the Luo Han Guo juice. The acids can be present in their undissociated form or else as their respective salts, for example, potassium or sodium hydrogen phosphate, potassium or sodium dihydrogen phosphate salts. The preferred acids are edible organic acids which include citric acid, malic acid, fumaric acid, adipic acid, gluconic acid, tartaric acid, ascorbic acid, acetic acid, or mixtures thereof. The most preferred acids are citric and malic acids.

Edible salts may also be included in the sweetening composition as well as in the edible beverages and foods. From about 0.01% to about 0.25% of salt in the sweetening composition is preferred. Alkali metal salts of the organic acids are preferred, as are alkaline earth metal salts. Calcium acetate, calcium citrate, sodim ascorbate and sodium citrate are preferred. Sodium chloride or potassium chloride can also be used.

In general, the weight ratio of Luo Han Guo juice to sugar in the beverage is from about 1:1 to about 1:5. For products which contain sugar, but at levels below that at which the sugars contribute to predominant sweetness and taste characteristics of the final product, the amount of sweetener used will vary according to the degree of sweetness desired and the degree of sweetness already provided by the sugars present.

In addition to the flavoring system and the sweetening system the beverage of the present invention can also comprise a mineral supplementation or a vitamin supplementation or mixtures thereof. The preferred mineral supplementation comprise calcium, potassium, magnesium, iron, sodium or mixtures of these minerals. Also trace mineral supplementation can be incorporated in the beverages according to the present invention. Amounts and methods for incorporation of the mentioned minerals are well known in the art. The level of the minerals is selected so as not to deteriorate the taste and organoleptic characteristics of the beverage composition.

In a particularly preferred embodiment of the beverage of the present invention supplemented ascorbic acid i.e., vitamin C will be added in an amount of up to 0.15%. "Supplemented ascorbic acid" is that which is added to the beverage; it does not include that which is incorporated by the flavoring system and the sweetening system, i.e., that which is present in the fruit juices. The ascorbic acid should be easily solubilized in the beverage. It can be synthetic or natural, e.g., extracted from fruits or vegetables.

Other optional ingredients typically present in fruit or vegetable juice can be included in the beverages of the present invention. For example, preservatives, vitamins and other minerals can be included. Suitable vitamins include A, D, E, $B_1$, $B_2$, $B_6$, $B_{12}$, K, niacin, panthotenic acid, folic acid, biotin and beta carotene. Other minerals which can be included are calcium, zinc, manganese, copper and other trace minerals. If desired, natural and synthetic colorings can be included in these beverages.

It is another aspect of the present invention to provide concentrates of the beverage according to the present invention but having a reduced water content. The concentrates when diluted will therefore result in a beverage according to the present invention. Typical concentrates are 2 times concentrates (which are used by mixing one part concentrate and one part water) to 6 times concentrates (which are used by mixing one part concentrate and 5 parts water), preferred are 3.5 to 5 times concentrates.

Dry forms of the beverages can also be prepared.

EXAMPLES

The following examples are given to demonstrate preferred embodiments of the present invention. They are non-limiting to the scope of the invention in that compositions and beverages within the scope of the disclosure of the present invention are not excluded by the exemplified embodiments.

Percentages are given as weight percent of total composition.

Mineral and Vitamin Supplement Premix

Carbonates are solubilized in an aqueous solution of the added citric and malic acid. The vitamins are solubilized in water.

| | |
|---|---|
| Calcium carbonate[1] | 0.025% |
| Magnesium carbonate[1] | 0.020% |
| Citric acid-added[1] | 0.075% |
| Malic acid-added[1] | 0.121% |
| Ascorbic acid[1] | 0.028% |
| Water | difference up to 20% |

[1]Calcium and magnesium carbonate, citric and malic acid and ascorbic acid are available in granular or powdered form and ought to satisfy food additive regulations when used in a beverage for human consumption.

| | Beverage composition | | | |
|---|---|---|---|---|
| Example | 1 | 2 | 3 | 4 |
| FC orange 65%[2] | — | 6% | 18.5% | — |
| FC multifruit 55%[2] | 11.5% | — | — | — |
| FC LHG 16%[2] | 1.3% | 2.0% | 0.7% | 2.0% |
| FC lemon 50%[2] | — | — | — | 4.0% |
| Tea flavor[3] | — | — | — | 0.1% |
| Mineral and vitamin supplement premix | — | — | — | 20% |
| Water | balance up to 100% | | | |

[2]FC orange 65%, FC multifruit 55%, FC lemon 50% are fruit juice concentrates of 65°, 55°and 50° Brix (weight % solubilized solids). They are available treated and untreated for their acidity, color, cloudiness and own flavor. They are available from many sources in many countries. Multifruit comprises citrus and non-citrus juices.
FC LHG 16% is a 16° Brix Luo Han Guo juice according to the present invention and prepared by the process of Example 5.
[3]Natural identical iced tea flavor on black tea basis available from e.g. Tastemaker MK Company, Cincinnati, Ohio, USA.

| | Beverage characteristics | | | |
|---|---|---|---|---|
| | Example 1 | Example 2 | Example 3 | Example 4 |
| Fruit juice content | 52% | 33% | 100% | 16% |
| sugar content | 6.3% | 3.9% | 12% | 1.9% |
| mogroside V | 0.0120% | 0.0184% | 0.0064% | 0.0184% |
| Luo Han Guo | 1.3% | 2.0% | 0.7% | 2.0% |
| descriptive taste name | Multifruit | Orange | Sweet orange | Lemon iced tea |
| added sugar | 0 | 0 | 0 | 0 |
| added artificial sweetener | 0 | 0 | 0 | 0 |
| calorie reduction: | | | | |
| relative to pure juice | 48% | 67% | 0% | 84% |
| relative to a beverage of 50% juice, water and artificial sweetener | 0% | 40% | — | 68% |

Example 5

Luo Han Guo fruit from China is picked and washed in water containing 20 ppm chlorine. The fruit is peeled by hand and the outer crust is removed. The core or meat of the fruit is mashed by hand and then passed through a finisher containing a strainer with a mesh size of 0.02 in. (0.05 cm) to 0.025 in. (0.012 cm). Citric acid is added to the juice which emerges from the finisher to lower the pH to less than 4.0. This acidified juice is processed in a blender for 45 seconds to form a juice puree having a particle size of less than 850 microns. It is passed through a 20 mesh screen (0.51 mm) to remove small seed pieces.

The filtered juice puree is then evaporated using a standard laboratory rotary evaporator system. The bath temperature is 52° C. to 54° C. and the juice is evaporated at a 26 (650 mm) to 28 inch (700 mm of mercury) vacuum.

The volatiles are discarded along with the water. The concentrated juice is hot pack pasteurized at 85° C. to 95° C. with a hold time of 60 seconds, filled into glass jars and then cooled for 20 to 30 minutes in an ambient temperature water bath.

Several juice samples were prepared. The following table summarizes the composition of the juices.

| Sample | pH | Total Brix | Volatiles | Mogroside |
|---|---|---|---|---|
| 1 | 3.9 | 16.4 | 23.2 ppm | 10.8 mg/g |
| 2 | 3.9 | 16.2 | 24.2 ppm | 11.6 mg/g |
| 3 | 3.9 | 17.2 | 21.3 ppm | 12.6 mg/g |
| 4 | 3.9 | 17.5 | 18.7 ppm | 12.1 mg/g |
| 5 | 4.0 | 17.5 | 19.5 ppm | 11.9 mg/g |
| 6 | 3.9 | 17.4 | 19.8 ppm | 12.3 mg/g |
| 7 | 3.9 | 17.4 | 29.3 ppm | 12.0 mg/g |
| 8 | 4.0 | 20.2 | 23.4 ppm | 14.5 mg/g |

The total volatiles before devolatilization was in the range of 50 or more ppm.

Example 6

Sugar Cookie Made With LHG Powder

| Ingredient | Percent |
|---|---|
| Sucrose | 10.30 |
| Polydextrose K (Pfizer) | 20.57 |
| Shortening (Crisco) | 4.70 |
| Water | 4.00 |
| Caramel and Vanilla flavor | 0.10 |
| Luo Han Guo powder (freeze dried with polydextrose) | 8.45 g |
| DRY MIX* | |
| Dry Egg Solids | |
| Flour | 34.96 |
| Sodium Bicarbonate | 0.46 |
| Baking Powder | 0.23 |
| Solka Floc (BW-40) | 1.00 |
| Defatted Rice Bran (Freeman) | 1.00 |
| Whey Protein | 1.26 |
| Egg White | 6.65 |
| Emulsifier (monoglyceride) | 4.74 |
| Salt | 0.22 |
| Total | 100 |
| Calories/100 g | 273 |

* Luo Han Guo powder - freeze dried mixture of 31 g polydextrose and 50 g single strength Luo Han Guo puree (16.7 Brix). The cookie is prepared by blending the dry mix with the other ingredients to form a dough. Dough balls are formed and baked at 350° F. for 8–12 minutes.

Example 7

Yellow Cake Formulation

| | Sucrose Control | Luo Han Guo Formulation |
|---|---|---|
| Sucrose | 31.02 | — |
| DL-200 (14% H2O) | — | — |
| Polydextrose | — | 7.02 |
| Cake Flour | 22.12 | 21.60 |
| Baking Powder | 1.18 | — |
| Salt | 0.52 | 0.34 |
| Shortening (Crisco) | 9.82 | — |
| Milk | 24.80 | — |
| Water | — | 3.19 |
| Vanilla | 0.62 | 0.08 |
| Butter Flavor (dry) | — | 0.17 |
| Eggs (blended fresh) | 9.92 | 21.75 |
| Sorbitol | — | 0.37 |
| Maltodextrin 100 | — | 9.37 |
| N-Flate | — | 4.10 |
| NaHCO3 | — | 0.70 |
| Solka-Floc | — | 2.00 |
| Glucono-delta lactose | — | 1.30 |
| *Xanthan Kaltrol F | — | 0.10 |
| Total | 100.0 | 100.0 |
| Calories/100 g | 334.5 | 224.4 |
| Calorie reduction | Base | −33% |

*a gum available from Kelco

A cake batter is prepared by creaming the shortening and sugar. The eggs and water are added. The dry ingredients are blended with the flour and added to the shortening/egg mixture. In the case of the sucrose formula the milk and dry ingredients can be added alternately. The cake batter is baked at 350° F. until done.

Example 8

Beverage With Attractive Sweetness and About One Calorie Per Serving

| Component | Amount (g/100) |
|---|---|
| Luo Han Guo Juice (16 Brix) | 1.5 |
| Flavor | 0.15 |
| Water | 98.35 |

Example 9

Sweetened Tea

| | |
|---|---|
| LHG sugar liquid concentrate | 5 grams |
| Brewed Tea (Lipton) | 1 cup |

Example 10

| | |
|---|---|
| White Grape Juice (single strength) | 12 |
| Lemon Juice (single strength) | 3.2 |
| Luo Han Guo juice (single strength) | 1.25 |
| Thickener (3.7 Brix) | 7.0 |
| Flavors | 0.01 |
| Water | 76.45 |
| Total | 100.00 |

Thickener is a gum such as guar gum or xanthan gums

Example 11

| | |
|---|---|
| Luo Han Guo juice (single strength) | 1.35 |
| Fructose | 1.50 |
| Flavors | 0.01 |
| Citric Acid | 0.15 |
| Thickener (3.7 Brix) | 3.0 |
| Water | 93.9 |
| Total | 100.00 |

The liquids are blended. Xanthan gum is used as the thickener. Other thickeners can be used.

Example 12

| Component | Amount (g/100) |
|---|---|
| Luo Han Guo Sweet Juice (15.8 Brix) | 37.85 |

-continued

| Component | Amount (g/100) |
|---|---|
| Fructose | 61.55 |

Example 13

| Component | Amount (g/100) |
|---|---|
| Luo Han Guo Sweet Juice (15.8 Brix) | 45.9 |
| Sucrose | 54.1 |

This sweetener can be used in place of sugar to flavor coffees.

What is claimed is:

1. A sweet reduced calorie, thirst quenching beverage comprising:
   (a) from about 0.001% to about 60% of a flavoring system, wherein the flavoring system comprises fruit juice, fruit flavors, botanical flavors, milk or milk-type flavors or mixtures thereof; and
   (b) a sweetening system comprising a naturally derived terpene glycoside, mogroside IV, mogroside V, siamenoside 1, 11-oxo-mogroside V or mixtures thereof in an amount of at least 0.002% by weight of said beverage; and
   (c) water; wherein said flavoring system and said sweetening system together provide said reduced calorie, thirst quenching beverage with a sugar content of less than 8% by weight on a single strength basis.

2. A reduced calorie, thirst quenching beverage according to claim 1 wherein said sugar content is from 0.5% to 6% by weight of said beverage on a single strength basis.

3. A reduced calorie, thirst quenching beverage according to claim 2 wherein said sugar content is from 0.5% to 3% by weight of said beverage on a single strength basis.

4. A sweet beverage according to claim 1 wherein said flavoring system comprises fruit juice selected from the group consisting of juices of citrus and non-citrus fruits and mixtures thereof.

5. A sweet beverage according to claim 4 wherein said flavoring system comprises a citrus fruit juice selected from the group consisting of juices of grapefruit, orange, lemon, lime, mandarin and mixtures thereof.

6. A sweet beverage according to claim 5 wherein said flavoring system comprises an orange juice.

7. A sweet beverage according to claim 6 wherein the amount of said fruit juice is from 9% to 35% by weight of said beverage on a single strength basis.

8. A sweet beverage according to claim 4 wherein the amount of said fruit juice is from 3% to 60% by weight of said beverage on a single strength basis.

9. A sweet beverage according to claim 1 being a reduced calorie, thirst quenching beverage comprising:
   (a) from about 0.01% to about 10% of a flavoring system.

10. A reduced calorie, thirst quenching beverage according to claim 9 wherein said sugar content is from 0.5% to 8% by weight of said beverage on a single strength basis.

11. A reduced calorie, thirst quenching beverage according to claim 10 wherein said sugar content is from 1% to 5% by weight of said beverage on a single strength basis.

12. A sweet beverage according to claim 1 wherein the amount of said naturally derived mogroside IV, mogroside V, siamenoside, 11-oxo-mogroside V or mixtures thereof is 0.002% to 0.1% by weight of said beverage on a single strength basis.

13. A sweet beverage according to claim 12 wherein the amount of said naturally derived mogroside IV, mogroside V, siamenoside I, 11-oxo-mogroside V or mixtures thereof is 0.008% to 0.054% by weight of said beverage on a single strength basis.

14. A sweet beverage according to claim 13 wherein the amount of said naturally derived mogroside IV, mogroside V, siamenoside I or mixtures thereof is 0.008% to 0.027% by weight of said beverage on a single strength basis.

15. A sweet beverage according to claim 1 wherein said sweetening system comprises juice of the fruit belonging to the botanical tribe Joliffieae of the botanical family Cucurbitaceae.

16. A sweet beverage according to claim 15 wherein said sweetening system comprises juice of Luo Han Guo.

17. A sweet beverage according to claim 16 wherein the amount of juice from the Luo Han Guo fruit is from 0.25% to 10% by weight on a single strength basis.

18. A sweet beverage according to claim 17 wherein the amount of juice from the Luo Han Guo fruit is from 1% to 6% by weight on a single strength basis.

19. A sweet beverage according to claim 1 further comprising a mineral supplementation, vitamin supplementation or mixtures thereof.

20. A sweet beverage according to claim 19 wherein said mineral supplementation is selected from the group consisting of calcium, magnesium, potassium, sodium, iron and mixtures thereof.

21. A sweet beverage according to claim 19 wherein said vitamin supplementation is selected from the group consisting of vitamin A, C, D, E, $B_1$, $B_2$, $B_6$, $B_{12}$, K, niacin, panthotenic acid, folic acid, biotin, beta-carotene and mixtures thereof.

22. A sweet beverage according to claim 1 which has been carbonated.

23. A beverage concentrate of the sweet beverage of claim 1.

24. A sweet beverage according to claim 1 which is a dry beverage.

25. A sweetener composition comprising:
   (a) sweet juice derived from the botanical genus/species Siraitia grosvenorii, Siraitia siamensis, Siraitia silomaradjae, Siraitia sikkimensis, Siraitia africana, Siraitia borneensis, Siraitia taiwaniana or mixtures thereof, wherein said sweet juice contains from about 0.1% to about 5% terpene glycosides selected from mogroside V, mogroside IV, siamenoside, 11-oxo-mogroside V and mixtures thereof; and
   (b) sugar, selected from the group consisting of fructose, sucrose, glucose and mixtures thereof; and wherein the ratio of said sweet juice to sugar is from about 1:1 to about 1:5.

26. A sweetener composition according to claim 25 wherein said sweet juice is from the botanical genus/species *Siraitia grosvenorii*.

27. A sweetener composition according to claim 26 wherein the ratio of mogroside V, mogroside IV, siamenoside, triterpene glycosides or mixtures thereof to sugar is from about 1:100 to about 1:1000.

28. A sweet beverage comprising:

(a) from about 0.002% to about 0.10% sweet terpene glycosides provided by a sweet juice from the fruit of the Cucurbitaceae family;

(b) from about 1% to about 3% sugar;

(c) from 0% to about 0.25% of an edible acid;

(d) from 0 to about 0.5% edible salt and (e) from about 0.001% to about 60% of a flavoring system, wherein the flavoring system comprises fruit juice, fruit flavors, botanical flavors, milk or milk-type flavors or mixtures thereof.

29. A sweet beverage according to claim 28 wherein the flavoring system is fruit juice; wherein said flavoring system comprises from about 0.5% to about 20% by weight of said beverage.

30. A sweet beverage according to claim 29 further comprising supplemental amounts of minerals, vitamins and mixtures thereof.

31. A sweet beverage according to claim 30 wherein said minerals are selected from the group consisting of calcium, magnesium, potassium, sodium, iron and mixtures thereof.

32. A sweet beverage according to claim 31 wherein said vitamins are selected from the group consisting of vitamin A, C, D, E, $B_1$, $B_2$, $B_6$, $B_{12}$, K, niacin, panthotenic acid, folio acid, biotin, beta-carotene and mixtures thereof.

* * * * *